(12) United States Patent
Park et al.

(10) Patent No.: US 8,197,113 B2
(45) Date of Patent: Jun. 12, 2012

(54) DISPLAY DEVICE

(75) Inventors: Se-Ki Park, Asan-si (KR); Joo-Woan Cho, Asan-si (KR); Sung-Kyu Shim, Seoul (KR); Young-Keun Lee, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 446 days.

(21) Appl. No.: 12/606,126

(22) Filed: Oct. 26, 2009

(65) Prior Publication Data

US 2010/0246209 A1 Sep. 30, 2010

(30) Foreign Application Priority Data

Mar. 24, 2009 (KR) ........................ 10-2009-0024978

(51) Int. Cl.
*F21V 7/04* (2006.01)

(52) U.S. Cl. ......... 362/631; 362/612; 362/622; 362/633

(58) Field of Classification Search ........ 362/97.1–97.4, 362/612, 613, 617, 618, 621–624, 631–634; 349/58, 62, 63, 65
See application file for complete search history.

(56) References Cited

U.S. PATENT DOCUMENTS

| 7,434,978 B2* | 10/2008 | Chou | 362/631 |
| 7,506,995 B2* | 3/2009 | Thomas et al. | 362/227 |
| 7,956,951 B2* | 6/2011 | Lee | 349/58 |
| 2010/0045198 A1* | 2/2010 | Lee et al. | 315/246 |

FOREIGN PATENT DOCUMENTS

| JP | 05-80722 | | 11/1993 |
| JP | 2004050822 | A | 2/2004 |
| KR | 10-2005-0048403 | A | 5/2005 |
| KR | 1020050107028 | A | 11/2005 |
| KR | 1020060007517 | A | 1/2006 |
| KR | 1020070008946 | A | 1/2007 |
| KR | 1020080026695 | A | 3/2008 |

* cited by examiner

*Primary Examiner* — Thomas Sember
(74) *Attorney, Agent, or Firm* — Innovation Counsel LLP

(57) ABSTRACT

Provided is a display device for an embodiment in which a central axis of a light guide plate (LGP) and a central axis of one or more light sources are matched with each other to maximize efficiency of the light sources, and which has an ultra-slim structure. The display device may include: a display panel which displays an image; an LGP which guides light to the display panel; light sources which are disposed on a side of the LGP and provide light to the LGP; a circuit board which is disposed on a side of the display panel with the light sources mounted on a surface thereof, and driving chips which drive the display panel mounted on an opposite surface thereof; and a frame which houses the LGP and the light sources and on which the circuit board and the display panel are mounted.

20 Claims, 8 Drawing Sheets

DISPLAY DEVICE

CROSS REFERENCE TO RELATED APPLICATION

This application claims priority from Korean Patent Application No. 10-2009-0024978 filed on Mar. 24, 2009 in the Korean Intellectual Property Office, the disclosure of which is incorporated herein by reference in its entirety.

BACKGROUND

1. Technical Field

The present invention relates to a display device, and more particularly, to a display device in which a central axis of a light guide plate (LGP) and that of one or more light sources are matched with each other to maximize efficiency of the light sources, and which has an ultra-slim structure.

2. Description of the Related Art

As modern society becomes more dependent on sophisticated information and communication technology, the market needs for larger and thinner display devices are growing. In particular, since conventional cathode ray tubes (CRTs) have failed to fully satisfy these market needs, the demand for flat panel displays (FPDs), such as plasma display panels (PDPs), plasma address liquid crystal display panels (PALCs), liquid crystal displays (LCDs), and organic light emitting diodes (OLEDs), is exploding.

Being low in power consumption, light, and compact, FPDs are widely applied in computer, electronics, and information and technology (IT) industries. These display devices each include a liquid crystal panel assembly having a liquid crystal panel which displays image information, a backlight assembly having one or more lamps which emit light and a light guide plate (LGP) which guides light emitted from the lamps toward the liquid crystal panel, and a housing accommodating the liquid crystal panel assembly and the backlight assembly therein.

Research is actively being conducted to reduce the overall thickness and weight of a display device by reducing sizes of frames and housings which form the exterior of the display device. Meanwhile, efforts are also being made to reduce the overall thickness of a display device by reducing the thickness of an LGP housed in a housing of the display device.

As the thickness of LGPs is reduced almost to that of optical sheets, the arrangement of an LGP and light sources is becoming important. In particular, since the arrangement of an LGP and light sources can directly affect light efficiency, the optimal arrangement of the LGP and the light sources is emerging as an important issue.

Accordingly, there is a need for a structure which can reduce the number of parts required and make a display device slimmer by integrating a driving circuit board, which drives a display panel, and a circuit board on which light sources are mounted, into a single circuit board.

SUMMARY

Embodiments of the present invention provide a display device having a backlight assembly on which a display panel is mounted, in which a central axis of a light guide plate (LGP) and that of one or more light sources are matched with each other to maximize efficiency of the light sources, and which has an ultra-slim structure.

However, embodiments of the present invention are not restricted to the one set forth herein. The above and other embodiments of the present invention will become more apparent to one of ordinary skill in the art to which the present invention pertains by referencing the detailed description of the present invention given below.

According to an embodiment of the present invention, there is provided a display device including: a display panel which displays an image; an LGP which guides light to the display panel; one or more light sources which are disposed on a side of the LGP and provide light to the LGP; a circuit board which is disposed on a side of the display panel with the light sources mounted on a surface thereof, and driving chips which drive the display panel mounted on an opposite surface thereof; and a frame which houses the LGP and the light sources and on which the circuit board and the display panel are mounted.

According to another embodiment of the present invention, there is provided a display device including: a display panel which displays an image; an LGP which guides light to the display panel; one or more light sources which are disposed on a side of the LGP and provide light to the LGP; a circuit board which is disposed on a side of the display panel with the light sources mounted on a surface thereof, and driving chips which drive the display panel mounted on an opposite surface thereof; and a frame which houses the LGP and the light sources and on which the circuit board and the display panel are mounted, wherein the frame does not cover a top surface or a side surface of the circuit board.

BRIEF DESCRIPTION OF THE DRAWINGS

The above and other aspects and features of the present invention will become more apparent by describing in detail exemplary embodiments thereof with reference to the attached drawings, in which.

DETAILED DESCRIPTION

Figure 1:
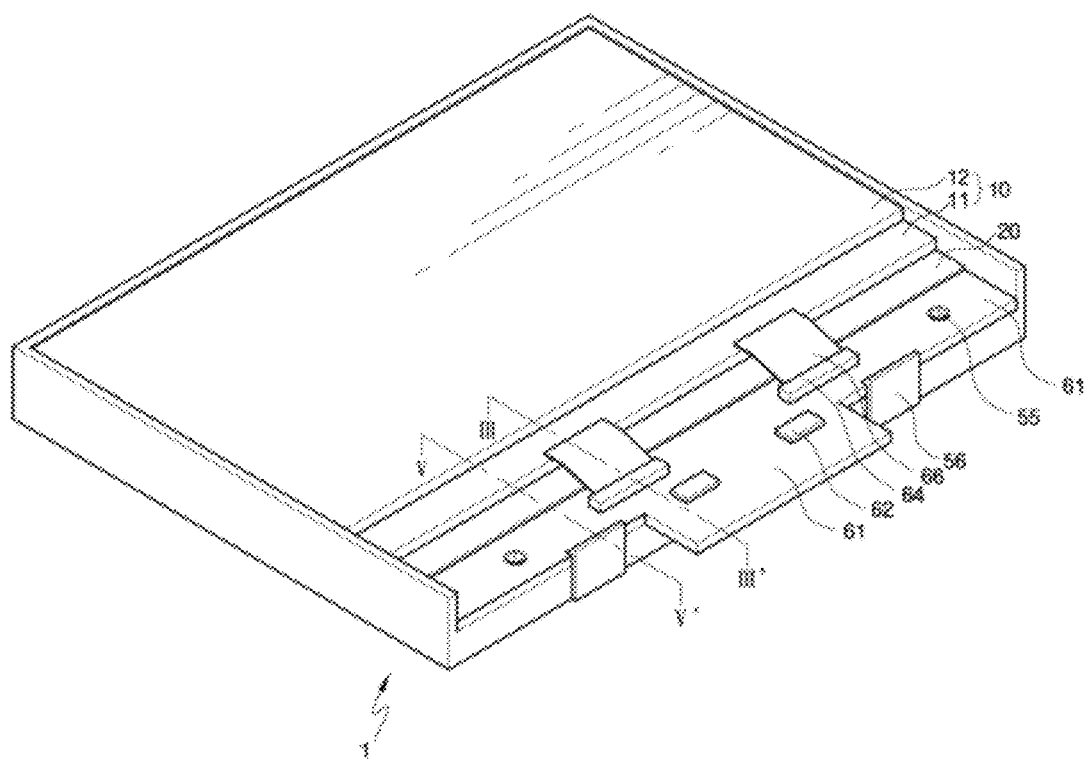
FIG. 1 is a perspective view of a display device according to a first exemplary embodiment of the present invention.

Advantages and features of embodiments of the present invention and methods of accomplishing the same may be understood more readily by reference to the following detailed description of exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Spatially relative terms, such as "below," "beneath," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 2:
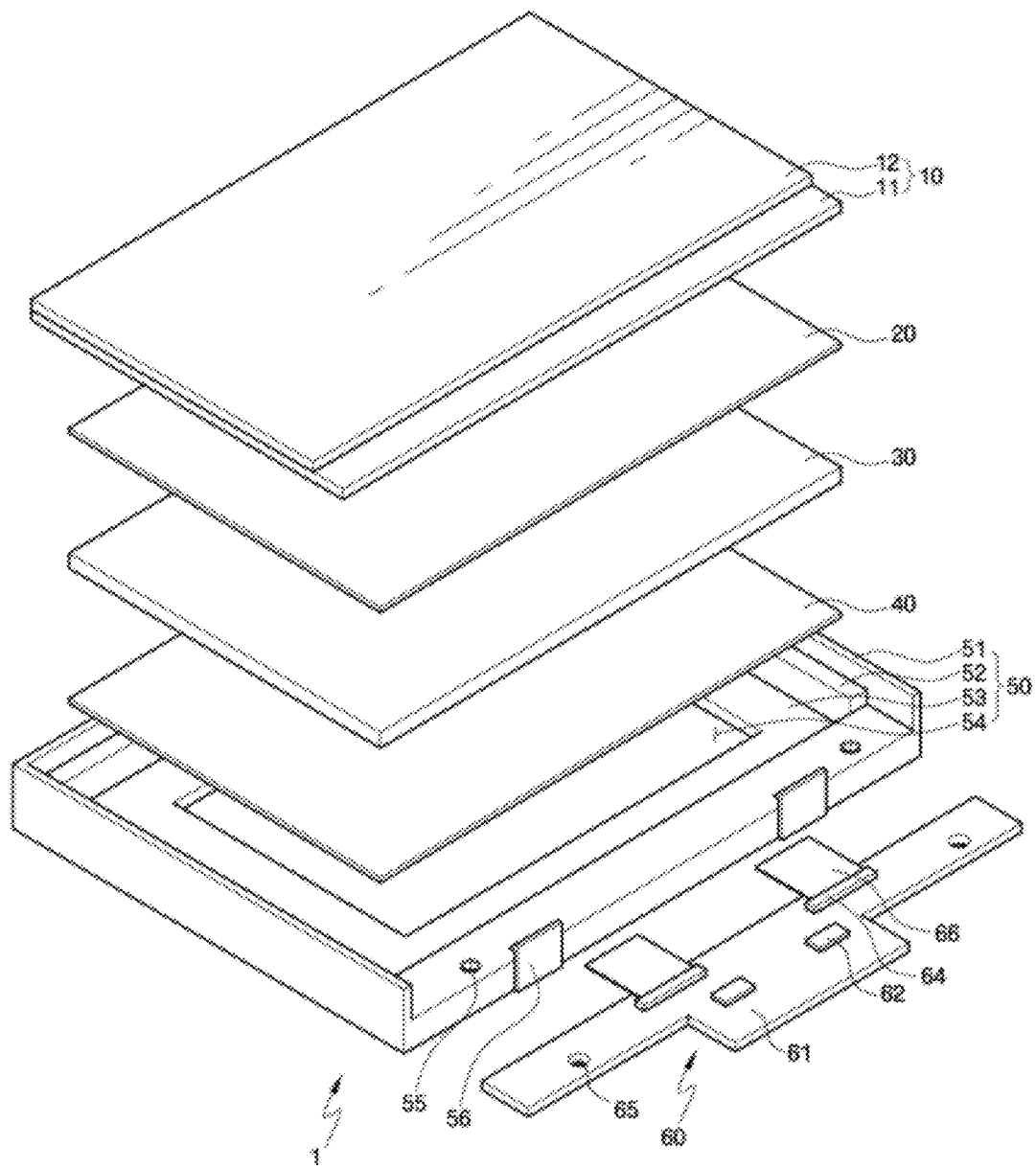
FIG. 2 is an exploded perspective view of the display device shown in FIG. 1.
Figure 3:
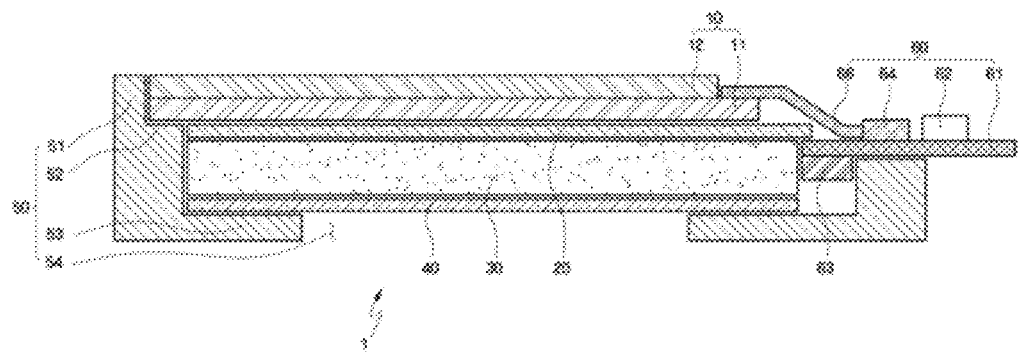
FIG. 3 is a cross-sectional view of the display device taken along the line III-III' of FIG. 1.
Figure 4A:
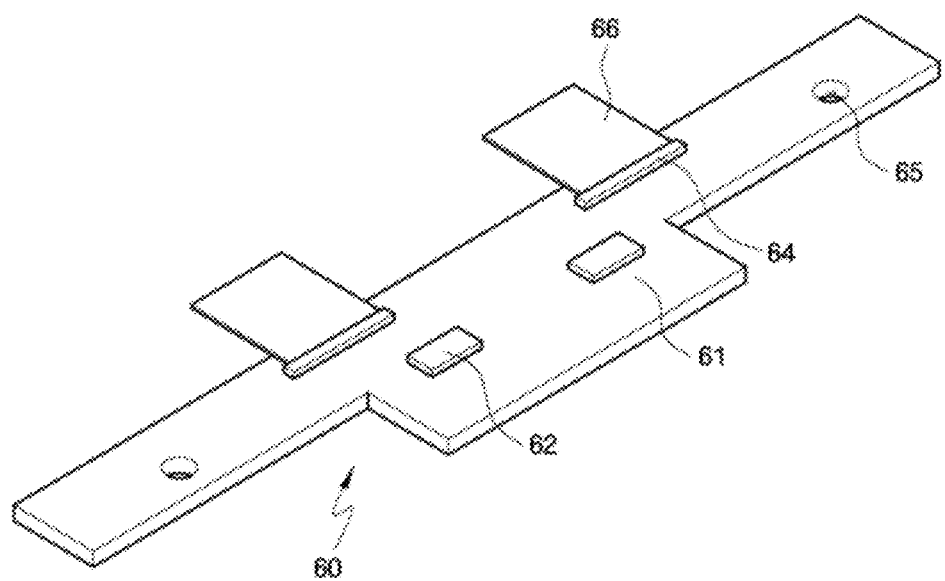
FIG. 4A is a top perspective view of a circuit board included in the display device of FIG. 1.
Figure 4B:
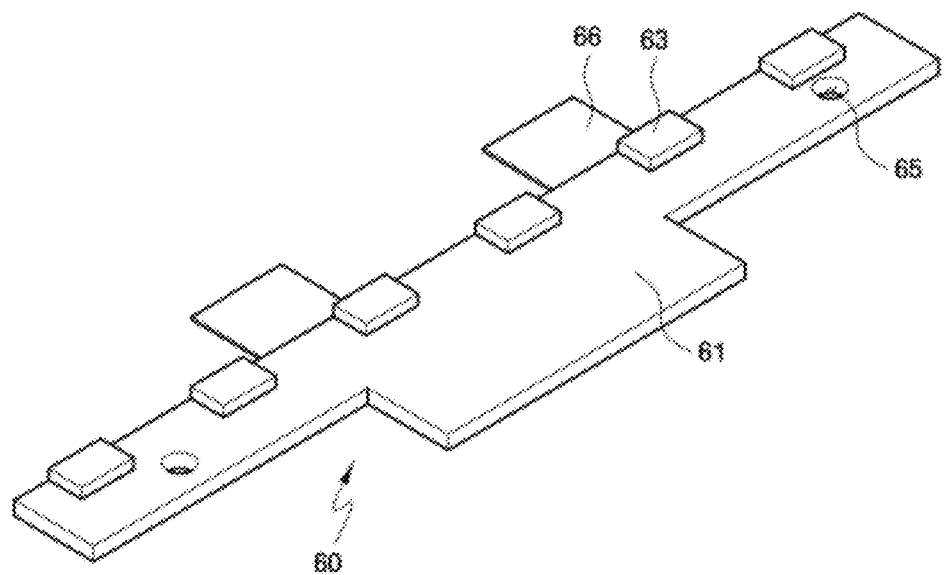
FIG. 4B is a bottom perspective view of the circuit board included in the display device of FIG. 1.
Figure 5:
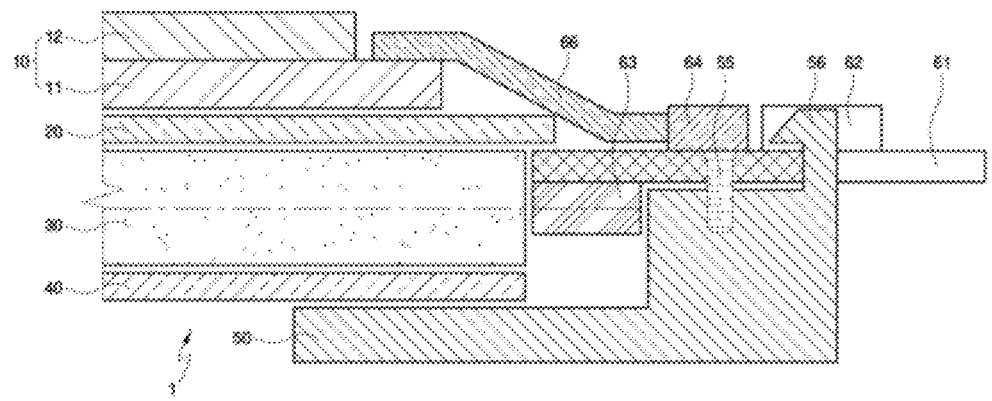
FIG. 5 is a cross-sectional view of the display device taken along the line V-V' of FIG. 1.

Hereinafter, a display device 1 according to a first exemplary embodiment of the present invention will be described in detail with reference to FIGS. 1 through 5. FIG. 1 is a perspective view of the display device 1 according to the first exemplary embodiment of the present invention. FIG. 2 is an exploded perspective view of the display device 1 shown in FIG. 1. FIG. 3 is a cross-sectional view of the display device 1 taken along the line III-III' of FIG. 1. FIG. 4A is a top perspective view of a circuit board 61 included in the display device 1 of FIG. 1. FIG. 4B is a bottom perspective view of the circuit board 61 included in the display device 1 of FIG. 1. FIG. 5 is a cross-sectional view of the display device 1 taken along the line V-V' of FIG. 1.

Referring to FIGS. 1 and 2, the display device 1 according to the first exemplary embodiment of the present invention includes a display panel 10, an optical sheet 20, a light guide plate (LGP) 30, the circuit board 61, a reflective sheet 40, and a frame 50.

The display panel 10 includes a lower substrate 11 and an upper substrate 12 facing the lower substrate 11. The lower substrate 11 includes gate lines (not shown), data lines (not shown), a thin-film transistor (TFT) array, pixel electrodes, and the like. The upper substrate 12 includes color filters, a black matrix, a common electrode, and the like. The color filters and the common electrode may also be formed on the lower substrate 11. The display panel 10 is mounted on a mounting portion 52 of the frame 50.

The frame 50 forms a surface on which the display panel 10 is mounted and houses the optical sheet 20, the LGP 30, and the reflective sheet 40 therein. The frame 50 includes a floor portion 53, sidewall portions 51, and the mounting portion 52.

The floor portion 53 is formed parallel to a surface of the display panel 10, and the sidewall portions 51 extend from the floor portion 53. The sidewall portions 51 surround the display panel 10, the optical sheet 20, and the LGP 30. The sidewall portions 51 may be formed on four side surfaces of the frame 50, respectively. When necessary, one of the sidewall portions 51 may be removed from a corresponding one of the four side surfaces of the frame 50.

The mounting portion 52 extends inwardly from the sidewall portions 51 and forms a surface on which the display panel 10 is mounted. The mounting portion 52 may be formed on one or more of the sidewall portions 51, and is not necessarily formed on all of the sidewall portions 51. The LGP 30 and the optical sheet 20 may be disposed inside the mounting portion 52.

An aperture 54 may be formed in the floor portion 53 of the frame 50 such that the reflective sheet 40 housed inside the frame 50 is not completely covered by the floor portion 53. The aperture 54 may reduce the total weight of the display device 1.

The frame 50 may be made of a material such as polycarbonate (PC) or a mixture of polycarbonate and acrylonitrile butadiene styrene copolymer.

The frame 50 may be made of non-translucent resin to prevent leakage of light to the outside. In addition, the frame 50 may be made of a flexible or non-rigid material to help prevent breakage of the display panel 10 mounted thereon.

The optical sheet 20 is disposed under the display panel 10. The optical sheet 20 is disposed on the LGP 30 and diffuses and concentrates light received from the LGP 30. The optical sheet 20 may include one or more of a diffusion sheet, a prism sheet, and a protective sheet. Alternatively, the optical sheet 20 itself may function as the diffusion sheet, the prism sheet, and the protective sheet. That is, a lower portion of the optical sheet 20 may have a diffusion function, a prism pattern (not shown) may be formed in an upper portion of the optical sheet, and a protective layer (not shown) may be formed on the prism pattern. Since the optical sheet 20 itself can perform the diffusion function and the prism function, the number of components required can be reduced, thereby making the display device 1 slimmer.

Referring to FIGS. 2 and 3, the LGP 30 and an integrated unit 60 are disposed under the optical sheet 20. The integrated unit 60 includes light sources 63 and is disposed on at least one side of the LGP 30.

The LGP 30 guides light emitted from the light sources 63 toward the display panel 10. The LGP 30 is a panel made of a transparent plastic material such as polymethylmethacrylate (PMMA) and guides light emitted from the light sources 63 toward the display panel 10 disposed above the LGP 30.

Light emitted from the light sources 63 travels inside the LGP 30 while being totally reflected inside the LGP 30. Here, part of the light totally reflected inside the LGP 30 exits the LGP 30 through a top surface of the LGP 30. The surface of the LGP 30 from which light exits (in this case, the top surface) is referred to as an exit surface. The exit surface functions as a surface light source which emits substantially uniform light across the exit surface.

Various patterns are printed on a bottom surface of the LGP 30, to guide light which is totally reflected inside the LGP 30 in an upward direction. The patterns printed on the bottom surface of the LGP 30 may be diffusion patterns or may form a reflective surface that reflects light.

The LGP 30 described in the present specification may have any shape as long as it can allow light incident on a side surface thereof to be totally reflected therein and then be uniformly output through the exit surface (in this case, the top surface). For example, the LGP 30 may be shaped like a plate having a predetermined thickness or more. However, the present invention is not limited thereto. That is, the LGP 30 may also be shaped like a very thin sheet. Even when the LGP 30 is very thin and thus virtually a light guide film, it is still referred to as a light guide plate (LGP).

The integrated unit 60 is disposed on a side of the LGP 30. The integrated unit 60 includes a light source unit which emits light and a driving unit which drives the display panel 10. The light source unit and the driving unit are mounted on the single circuit board 61.

The display device 1 according to the first exemplary embodiment of the present invention has an edge-type structure in which the light sources 63 are disposed on a side of the LGP 30. Since the integrated unit 60 is disposed on a side of the LGP 30, the LGP 30 functions as a surface light source which uniformly provides light that is received from the light sources 63.

The integrated unit 60 includes the light sources 63, the circuit board 61, driving chips 62, flexible films 66, and connectors 64.

The light sources 63 may be point light sources such as light emitting diodes (LEDs). LEDs can provide high-luminance light with low power consumption, and light emitted from the LEDs has very high color purity. The light sources 63 may be a single LED which emits light of a single color. Alternatively, the light sources 63 may be a plurality of LEDs which individually emit red light, green light, or blue light. The red light, the green light, and the blue light thus emitted from the individual LEDs may result in higher color purity, thereby enabling the display device 1 to display a high-quality image.

In addition, since the red light, the green light, and the blue light can be controlled separately, color temperatures of the light sources 63 can be controlled easily. Consequently, the display device 1 can represent color more richly.

The light sources 63 may be mounted on a bottom surface of the circuit board 61. The circuit board 61 has the light sources 63 mounted on the bottom surface thereof and the driving chips 62, which drive the display panel 10, mounted on a top surface thereof. The light sources 63 and the driving chips 62 may be mounted on both surfaces of the circuit board 61 using surface mount technology. Various wiring patterns (not shown) may be formed on the top and bottom surfaces of the circuit board 61.

Referring to FIGS. 3 and 4A, the driving chips 62 are mounted on the top surface of the circuit board 61. The driving chips 62 are designed to drive the display panel 10 and may provide gate signals or data signals to the gate lines (not shown) or the data lines (not shown). The driving chips 62 mounted on the top surface of the circuit board 61 may not be limited to chips for driving the display panel 10. For example, the driving chips 62 may also be various chips for controlling the light sources 63.

The circuit board 61 and the display panel 10 are connected to each other by the flexible films 66. The flexible films 66 are circuit boards made of a flexible material. The flexible films 66 include various wiring elements that connect the circuit board 61 to the display panel 10. The flexible films 66 may be attached to a surface of the display panel 10 and connected to the circuit board 61 by the connectors 64.

The connectors 64 separably connect the flexible films 66 to the circuit board 61. The flexible films 66 and the circuit board 61 may not necessarily be connected to each other by the connectors 64, however. For example, the flexible films 66 may be mounted directly on the circuit board 61.

The circuit board 61 may include fixing holes 65 in its regions that overlap the frame 50.

Referring to FIGS. 4B and 5, the light sources 63 are arranged on the bottom surface of the circuit board 61. The light sources 63 may be arranged in a line at regular intervals along an edge of the circuit board 61. Here, the light sources 63 may be LEDs that emit light through side surfaces thereof. That is, light may be emitted from the light sources 63 in a direction parallel to or in substantially the same plane as the circuit board 61.

The light sources 63 and the LGP 30 may be disposed such that a central axis of the light sources 63 matches a central axis of the LGP 30. When the central axis of the light sources 63 matches the central axis of the LGP 30, the loss of light emitted from the light sources 63 can be reduced, thereby maximizing efficiency of the light sources 63.

The circuit board 61 may be disposed such that it is in substantially the same plane as the exit surface of the LGP 30. Here, a gap may be formed between the circuit board 61 and the LGP 30, and a portion of the optical sheet 20 may extend from over the exit surface of the LGP 30 to overlap the gap between the circuit board 61 and the LGP 30. When the optical sheet 20 overlaps the gap between the circuit board 61 and the LGP 30 as described above, leakage of light between the circuit board 61 and the LGP 30 can be prevented.

The portion of the optical sheet 20 which overlaps the gap between the circuit board 61 and the LGP 30 may be coated with a reflective material or a light-blocking material.

Catching protrusions 56 are formed on a side surface of the frame 50. The catching protrusions 56 allow the circuit board 61 and the frame 50 to be hooked to each other. The catching protrusions 56 are formed on an outer side surface of the frame 50 and fix a side of the circuit board 61 to the frame 50 to prevent the circuit board 61 from moving upward. To prevent the circuit board 61 from moving horizontally, that is, in a direction parallel to or in substantially the same plane as the LGP 30, the circuit board 61 may be fixed to the frame 50 by screws 55.

The circuit board 61 includes the fixing holes 65 and may be fixed to the frame 50 by the screws 55 that are inserted into the fixing holes 65.

At least a portion of the circuit board 61 may protrude out of the frame 50. The circuit board 61 may be formed to a width that allows the light sources 63 to be mounted on the circuit board 61, as well as an extended portion on a side thereof to provide a space on which the driving chips 62 can be mounted.

The frame 50 does not cover the top or side surface of the circuit board 61. Thus, the circuit board 61 is exposed to the outside of the frame 50. Since the circuit board 61 is exposed to the outside of the frame 50, heat generated by the light sources 63 and the driving chips 62 can be easily dissipated.

Referring back to FIGS. 2 and 3, the reflective sheet 40 is disposed under the LGP 30. The reflective sheet 40 is installed under the LGP 30 and reflects light which is emitted downward from the LGP 30 in an upward direction. More specifically, light which has not already been reflected by minute dot patterns (not shown) formed on the bottom surface of the LGP 30, is reflected by the reflective sheet 40 toward the exit surface of the LGP 30. Therefore, the reflective sheet 40 reduces the loss of light which is incident on the display panel 10 and, at the same time, improves the uniformity of light which is output from the exit surface of the LGP 30.

Figure 6:
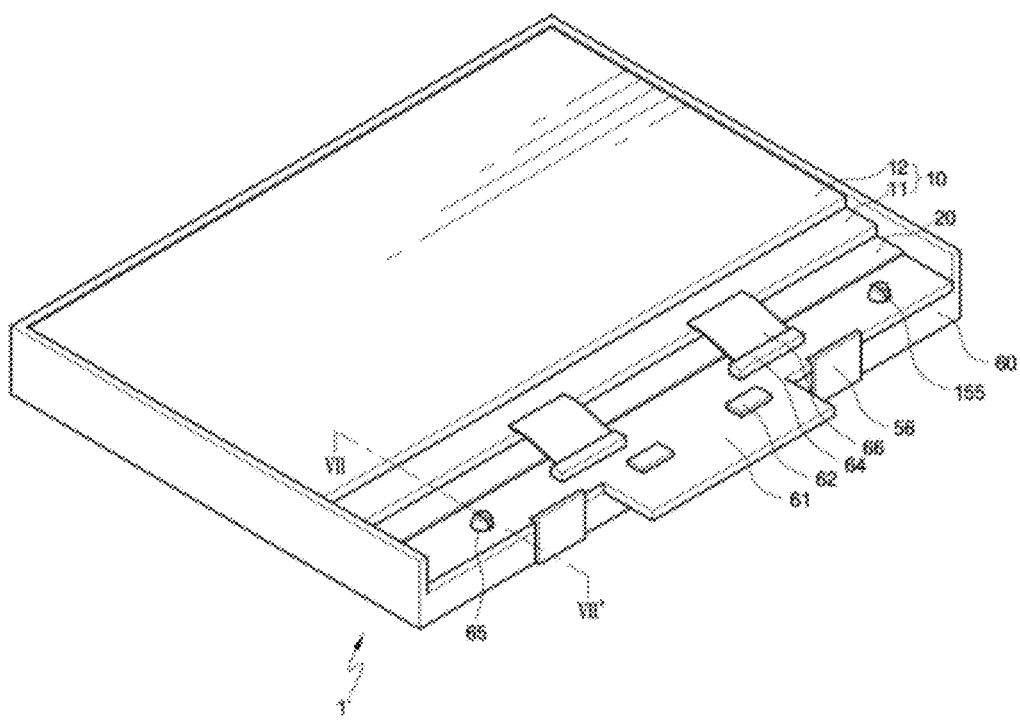
FIG. 6 is a perspective view of a display device according to a second exemplary embodiment of the present invention.
Figure 7:
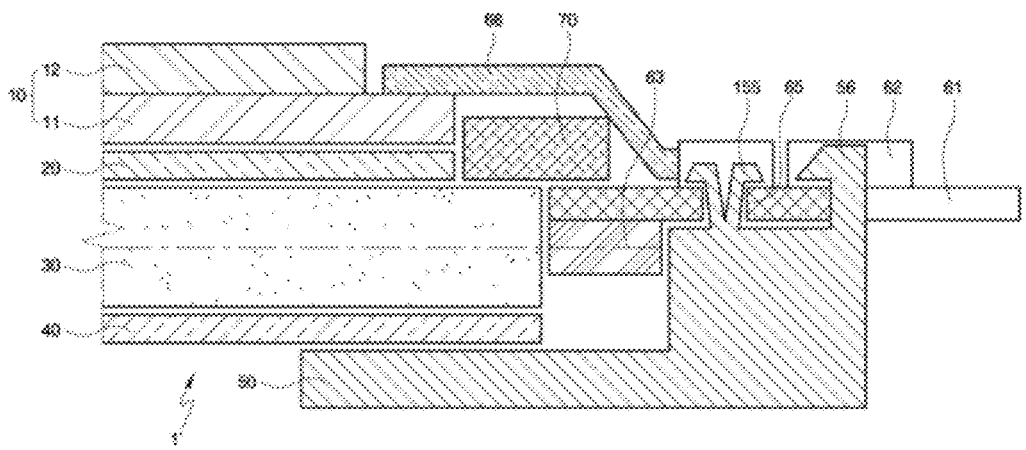
FIG. 7 is a cross-sectional view of the display device taken along the VII-VII' of FIG. 6.

Hereinafter, a display device 1' according to a second exemplary embodiment of the present invention will be described in detail with reference to FIGS. 6 and 7. FIG. 6 is a perspective view of the display device 1' according to the second exemplary embodiment of the present invention. FIG. 7 is a cross-sectional view of the display device 1' taken along the line VII-VII' of FIG. 6. For simplicity, elements substantially identical to those of the first exemplary embodiment are indicated by like reference numerals, and thus their description will be omitted.

In the display device 1' according to the second exemplary embodiment of the present invention, a frame 50 has fixing protrusions 155 which penetrate a circuit board 61.

As described above, catching protrusions 56 of the frame 50 fix a side of the circuit board 61 to the frame 50 and thus prevent the circuit board 61 from moving upward. The fixing protrusions 155 may be formed on a side of the frame 50 to prevent the circuit board 61 from moving in a horizontal direction.

The fixing protrusions 155 may be formed as elastic hooks. The fixing protrusions 155 may penetrate the circuit board 61 through the fixing holes 65 and hook the circuit board 61 to the frame 50.

Since the fixing protrusions 155 pass through the fixing holes 65 to couple the circuit board 61 to the frame 50, the circuit board 61 can be securely fixed to the frame 50.

A light-blocking member 70 may further be installed to overlap a gap between an LGP 30 and the circuit board 61, thereby preventing leakage of light through the gap between the LGP 30 and the circuit board 61. Since the light-blocking member 70 prevents the leakage of light between the LGP 30 and the circuit board 61, the efficiency of light sources 63 can be increased. When the light-blocking member 70 is formed overlapping the gap between the LGP 30 and the circuit board 61, there is no need for at least a portion of an optical sheet 20 to overlap the circuit board 61. Instead, the optical sheet 20 may be disposed on a region of the LGP 30 which is overlapped by a display panel 10.

Figure 8:
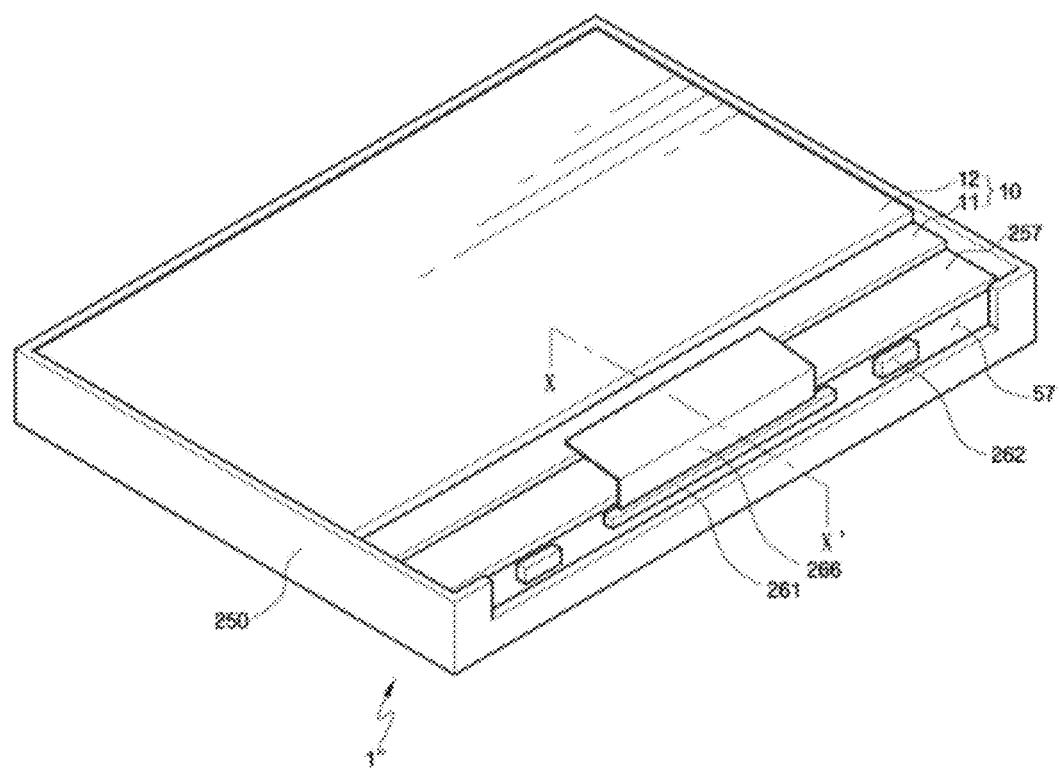
FIG. 8 is a perspective view of a display device according to a third exemplary embodiment of the present invention.
Figure 9:
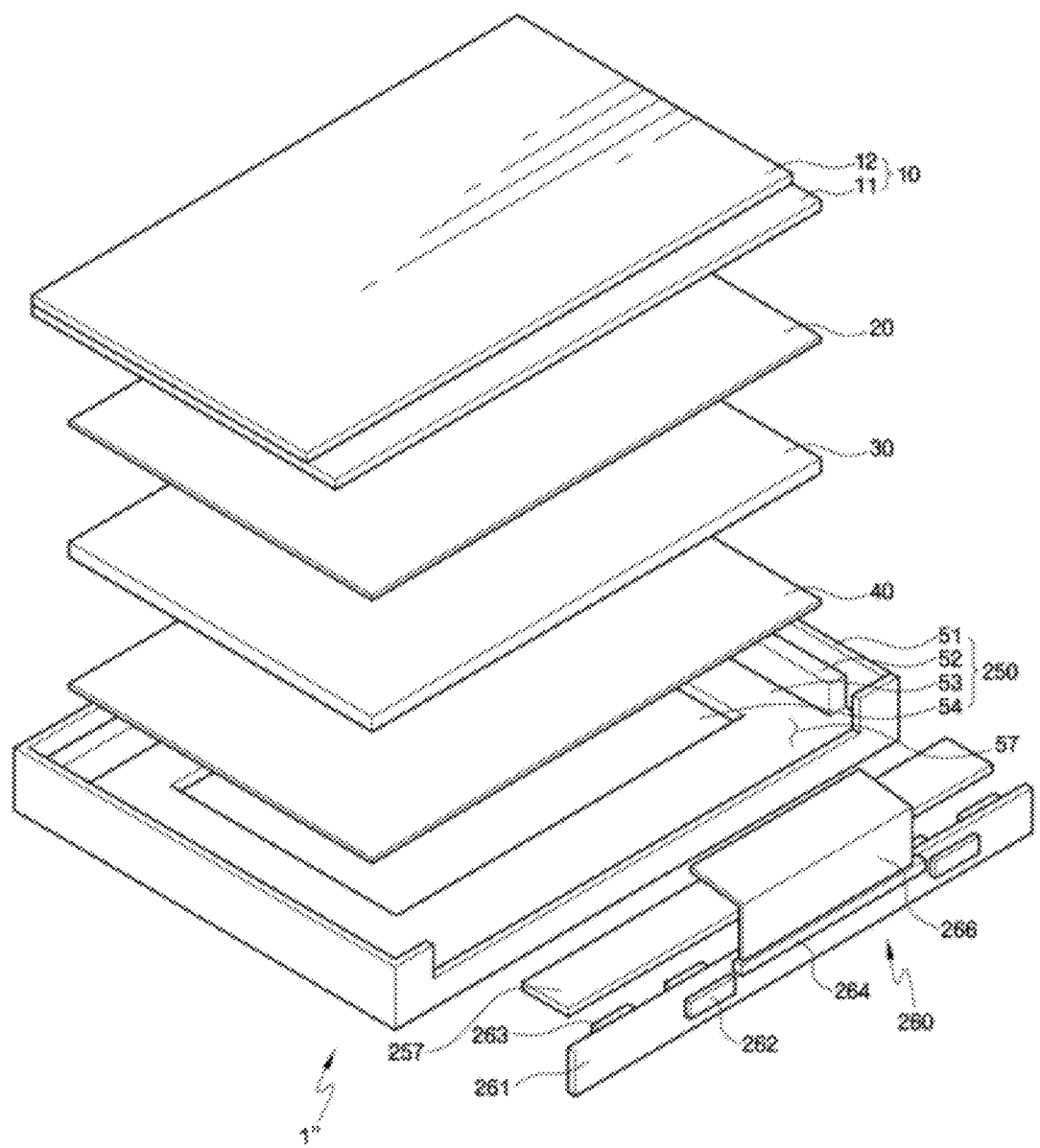
FIG. 9 is an exploded perspective view of the display device shown in FIG. 8.
Figure 10:
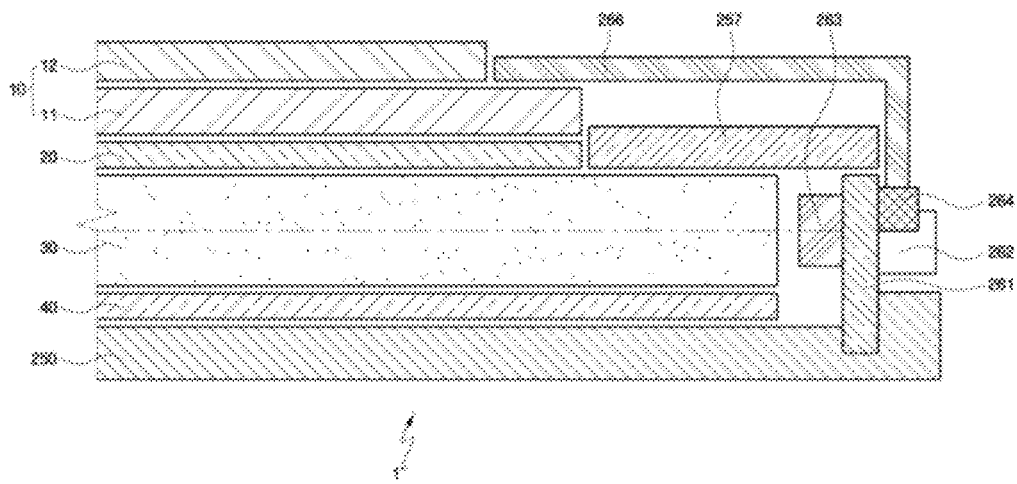
FIG. 10 is a cross-sectional view of the display device taken along the line X-X' of FIG. 8.

Hereinafter, a display device 1″ according to a third exemplary embodiment of the present invention will be described in detail with reference to FIGS. 8 through 10. FIG. 8 is a perspective view of the display device 1″ according to the third exemplary embodiment of the present invention. FIG. 9 is an exploded perspective view of the display device 1″ shown in FIG. 8. FIG. 10 is a cross-sectional view of the display device 1″ taken along the line X-X' of FIG. 8. For simplicity, elements substantially identical to those of the first exemplary embodiment are indicated by like reference numerals, and thus their description will be omitted.

In the display device 1″ according to the third exemplary embodiment of the present invention, a circuit board 261 on which light sources 263 are mounted is disposed perpendicular to an LGP 30.

The display device 1″ includes a display panel 10, an optical sheet 20, the LGP 30, the circuit board 261, a reflective sheet 40, a light source cover 257, and a frame 250. As described above, the reflective sheet 40, the LGP 30, the optical sheet 20, and the display panel 10 are sequentially disposed on the frame 250. The frame 250 includes a floor portion 53, sidewall portions 51, and a mounting portion 52. The sidewall portions 51 surround sides of the LGP 30, the optical sheet 20, and the display panel 10. At least one of the sidewall portions 51 has a slit portion 57. The circuit board 261 having the light sources 263 mounted thereon may be disposed on one of the sidewalls portions 51 in which the slit portion 57 is formed.

The circuit board 261 on which the light sources 263 are mounted is disposed on a side of the LGP 30 to be perpendicular to the LGP 30. Here, the light sources 263 may be mounted on a surface of the circuit board 261, which is adjacent to the LGP 30, and driving chips 262 may be disposed on an opposite surface of the circuit board 261.

The light sources 263 may be LEDs which emit light through top surfaces thereof in a direction perpendicular to the circuit board 261. The light sources 263 may be arranged in a line at regular intervals on a surface of the circuit board 261.

A connector 264 may be formed on a surface of the circuit board 264 which is opposite to the surface of the circuit board 261 on which the light sources 263 are mounted. The connector 264 may connect a flexible film 266 to the circuit board 261, and the flexible film 266 may be attached to a lower substrate 11 of the display panel 10. The flexible film 266 may provide control signals generated by the driving chips 262 to the display panel 10.

Since the circuit board 261 has the light sources 263 mounted on a surface thereof and the driving chips 262 mounted on the other surface thereof, high temperatures may be generated by the circuit board 261. The heat generated by the circuit board 261 may be dissipated to the outside through the slit portion 57 of the frame 250. That is, since at least a portion of the circuit board 261 is uncovered due to the slit portion 57 of the frame 250, heat generated by the light sources 263 and the driving chips 262 can be quickly dissipated to the outside of the frame 250.

The light source cover 257 may be disposed over the frame 250 to cover the light sources 263 and the circuit board 261. The light source cover 257 prevents leakage of light emitted from the light sources 263. At least a portion of the light source cover 257 may overlap the LGP 30 to cover a gap between the light sources 263 and the LGP 30. The inside of the light source cover 257 may be coated with a reflective material to reflect light emitted from the light sources 263.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:
1. A display device comprising:
a display panel adapted to display an image;
a light guide plate (LGP) adapted to guide light to the display panel;
one or more light sources which are disposed on a side of the LGP and adapted to provide light to the LGP;
a circuit board which is disposed on a side of the display panel, wherein the light sources are mounted on a surface thereof and driving chips which are adapted to drive the display panel are mounted on an opposite surface thereof; and
a frame which receives the LGP and the light sources and on which the circuit board and the display panel are seated.

2. The display device of claim 1, wherein a central axis of the light sources is aligned with a central axis of the LGP.

3. The display device of claim 1, wherein the circuit board is disposed parallel to or substantially in the same plane as the LGP.

4. The display device of claim 3, further comprising an optical sheet which is disposed between the display panel and the LGP, wherein at least a portion of the optical sheet overlaps the circuit board.

5. The display device of claim 4, wherein a reflective material or a light-blocking material is coated on a portion of the optical sheet which overlaps a gap between the LGP and the circuit board.

6. The display device of claim 3, wherein the circuit board is hooked to the frame.

7. The display device of claim 6, wherein the frame further comprises fixing protrusions which penetrate the circuit board.

8. The display device of claim 6, wherein the frame further comprises catching protrusions which fix a side of the circuit board to the frame.

9. The display device of claim 3, further comprising a light-blocking member which overlaps a gap between the LGP and the circuit board.

10. The display device of claim 1, wherein the light sources are light-emitting diodes (LEDs) which emit light through side surfaces thereof.

11. The display device of claim 1, wherein at least a portion of the circuit board protrudes out of the frame.

12. The display device of claim 1, wherein the circuit board is disposed perpendicular to the LGP.

13. The display device of claim 12, further comprising a light source cover which is disposed over the frame to cover the light sources and the circuit board, wherein at least a portion of the light source cover overlaps the LGP.

14. The display device of claim 12, wherein the light sources are LEDs which emit light through top surfaces thereof.

15. The display device of claim 1, wherein the circuit board and the display panel are connected to each other by a flexible film.

16. The display device of claim 1, wherein the circuit board is exposed to the outside of the frame.

17. A display device comprising:
a display panel adapted to display an image;
an LGP adapted to guide light to the display panel;
one or more light sources which are disposed on a side of the LGP and are adapted to provide light to the LGP;
a circuit board which is disposed on a side of the display panel and has the light sources mounted on a surface thereof and driving chips, which are adapted to drive the display panel, mounted on an opposite surface thereof; and
a frame which receives the LGP and the light sources and on which the circuit board and the display panel are seated,
wherein the frame does not cover a top surface or a side surface of the circuit board.

18. The display device of claim 17, wherein a central axis of the light sources is aligned with a central axis of the LGP.

19. The display device of claim 17, wherein the circuit board is disposed parallel to or substantially in the same plane as the LGP.

20. The display device of claim 17, wherein the circuit board is disposed perpendicular to the LGP.

* * * * *